July 27, 1943.  H. L. MURRAY  2,325,534
METHOD OF TREATING ICE CREAM MIXES AND THE LIKE
Filed Dec. 5, 1939
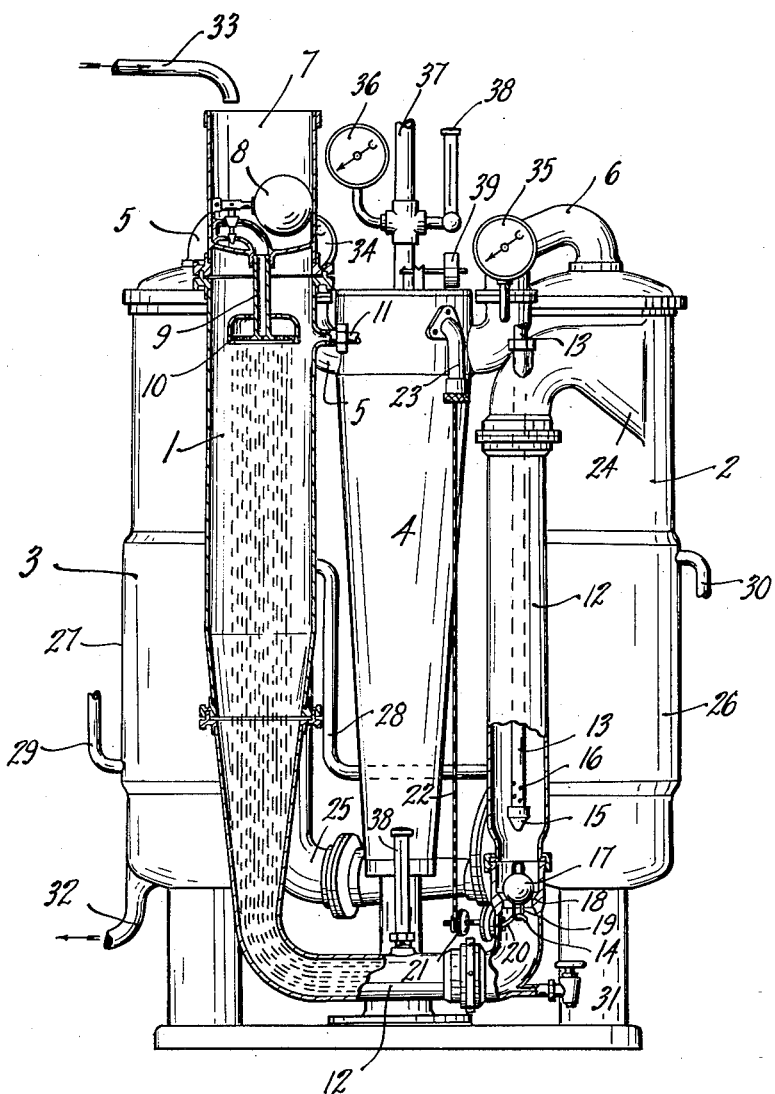

Patented July 27, 1943

2,325,534

UNITED STATES PATENT OFFICE 2,325,534

METHOD OF TREATING ICE CREAM MIXES AND THE LIKE

Henry Lamont Murray, Epsom, Auckland, New Zealand, assignor to Murray Deodorisers Limited, Auckland, New Zealand Application December 5, 1939, Serial No. 307,714
In New Zealand December 22, 1938

9 Claims. (Cl. 99—136)

My invention relates to the treatment of ice cream mixes and the like. More particularly, it relates to the preliminary treatment, broadly referred to by the generic term pasteurization, of ice cream mixes, preparatory to freezing.

In recent years, in view of the increasing concentration of the retail dairy business in the hands of a number of large companies, the practice has become of increasing importance to prepare ice cream mixes in one central plant and to then hold the mix there for freezing at a later time, or to ship it in commerce over considerable distances to plants where the mix is then frozen, for consumption. Thus it may be several days between the time that the mix is first made up and the time when it is frozen; and a further lapse of time occurs between freezing and actual consumption. Accordingly, the problems encountered are more complicated, severe and exacting than they were in the earlier days, when a mix was simply run through a pasteurizer, dumped into a freezer, and frozen, all in one connected series of events, the pasteurizing step frequently being entirely omitted. Accordingly, considerable research has been devoted by the industry, directed towards the realization of a thoroughly satisfactory method of preliminarily treating ice cream mixes. All of these attempts have to date, however, been attended by some one or more defects or drawbacks, which have prevented them from proving thoroughly satisfactory, or from going into widespread commercial use.

Among the objects of my invention is the production of a simple, effective and thoroughly economical method of preliminarily treating an ice cream mix so as to pasteurize the same thoroughly and so render the mix practically sterile; to reduce the acidity of the mix by extracting the volatile acids; to rid the mix substantially of volatile essences such as freed fatty acids, vegetable essences and atmospheric contaminations; to impart to the mix a more uniform flavor than has hitherto been obtainable, to give to the mix better keeping qualities and smoother physical characteristics, and to endow the ice cream produced from the mix with greater ability to withstand melting under prevailing atmospheric conditions, all this being achieved along with a minimum of consumption of expenditure or time, so that the capital investment in equipment is utilized to the greatest possible extent.

Another of the objects of my invention is the production of a mix which will result in an ice cream which is characterized by the absence of a cooked or stewed flavor, in which there is no burnt flavor similar to that resulting from caramelization of sugar, and to which may be imparted by my method if desired, a sweet nutty taste.

Other objects in part will be obvious and in part pointed out hereinafter.

The invention accordingly consists in the several steps of operation and the relation of each of the same to one or more of the others, and in the products resulting from the several steps, all as described herein, the scope of the application being indicated in the appended claims.

As conducive to a better understanding of my invention, it may be pointed out that, as is well known to those familiar with the art, commercial ice cream usually consists of cream, milk, concentrated milk, sugar, and some bonding agent or filler such as agar, gelatine, or the like, along with the desired flavoring ingredient. It is the sugar and filler which give rise to the principal difficulties in the preliminary treatment of an ice cream mix.

In a typical instance according to the prior practice, the milk and cream are blended, and thoroughly mixed, whereupon this blended mixture is raised to say 145° F., in a holding or batch type of pasteurizer, at which point the sugar and gelatine or other bonding or filling agent are added, whereupon the mix is held at this pasteurizing temperature for say half an hour. This customary practice, which has attained widespread use despite its manifold drawbacks, simply because a completely satisfactory process has not been evolved prior to my invention, has many disadvantages. Among these may be enumerated the presence of foreign flavors in the mix, even after pasteurization, due to the reaction from previous bacterial action, to aromatic or volatile oil flavors from the feed on which the milk cattle are fed, to freed fatty acids, and to absorbed gases. Of course many suggestions and proposals have been advanced, in this very active and alert art, looking towards improving the preliminary treating process as practiced, but while such new proposals may each have included some one or more features of advantage, there was always present some detrimental factor which prevented the new technique from attaining widespread commercial recognition.

The impaired flavor of the ice cream mix when treated in the manner aforesaid may quite possibly follow as a result of overcooking, that is, to an exposure over a long period of time to an elevated temperature, which while it ranges within narrow limits of say the order of 145° F. at atmospheric pressure, which is appreciably below the boiling point of the liquid, nevertheless results, during the half hour or so at which the mix must be maintained at that temperature in order to ensure even partially satisfactory pasteurization, in what may be termed a "cooked" or "stewed" flavor, which has been commented upon unfavorably from time to time. These cooked or stewed flavors generally may be chiefly ascribed to a portion of the mix being affected by contact with the metal at excess temperatures.

The presence of flavors in the mix foreign to what is expected or desired therein are due to three-fold causes, one of which is that bacterial action which takes place from the time of milking to the time of pasteurization is found to result in changes, in the mix, probably chemical in nature, which alter the flavor of the mix, an alteration which persists even after pasteurization has been carried out according to the known and accepted practice. Another source of such foreign flavors is the presence in the mix of aromatic and volatile flavoring oils resulting from the feedstuffs on which the milk cattle are fed, as well as from fatty acids which are liberated from the butter fat. Volatile vegetable contaminations are consequent upon the practice of the diarymen of today to develop pasturing advantageous to quantity production of fat, so that the plants raised for the cattle to graze upon are limited to a selected few. Cows are no longer permitted to roam at will and to select the wide variety of food that nature intended. As a consequence though the ration received may be fully balanced according to nutritive standards, the cattle are forced to consume excessive quantities of plant essences of substantially the same or similar types. While the cattle can dispose of a ration comprising a wide variety of plant essences they are unable to eliminate in the process of digestion an undue proportion of oils of a particular type or types with the result that the residue of the oils not disposed of is carried by the blood stream, principally to the mammary gland, and disposed of in the milk stream.

The contamination of flavor from the feedstuffs is accentuated in the springtime, when by the use of top-dressing the lushness of the plant growth often results in an alteration of flavor so marked as to be noticeable as "feed-flavor." Too, the consumption by the cattle of certain roots, concentrates, weeds, leaves, etc., also result in the presence of detrimental flavors in the mix. More important, however, is the very real danger that whereas the pungent essences can be detected by the senses of the consumer, yet all mixes contain chemicals arising from the food consumed by the cattle, and some of these chemical substances, bacterial products, gases, etc., if allowed to remain in the mix, will exert definitely harmful influences on the mix, as by hastening the oxidation of the butterfat, thereby setting up what may be termed off-flavors, and in general, reducing both the quality and the keeping power of the mix.

It might be pointed out that gelatine, when the latter is used as the binder or filler, is found to be a great potential source of bacterial contamination, resulting in extraneous flavors, and requiring extremely careful pasteurizing practices. Thus it will be observed that the problems encountered in the preliminary treatment of ice cream mixes are much more complex and consequently more difficult of successful solution than in the case of pasteurization of milk or cream.

An object of my invention, therefore, is to avoid these aforementioned difficulties and disadvantages, and to evolve a method of preliminarily treating ice cream mixes which will impart thereto the many advantages referred to hereinbefore.

In its broadest aspects, my invention comprises subjecting the ice cream mix to flash pasteurization at an elevated temperature sufficient to pasteurize the mix completely in the course of say one to five seconds, without imparting a scorched or cooked flavor thereto, and subsequently boiling the mix for an extremely short period of time at sub-atmospheric pressures and hence at reduced temperatures, in order to rid the mix of most of the said volatile or aromatic oils or essences, and fatty acids. This step may be followed, if desired, by subsequent cooling at still further reduced pressures, a procedure which I have found advantageous in that it imparts to the mix a sweet, nutty flavor. Preferably, I accomplish the pasteurizing by separating the mix into a thin film or stream or into a series of droplets, and intermingling these particles with steam, at sub-atmospheric pressure. This procedure results in the "flashing" of the mix to the temperature of the steam, which by subjecting the mix to a vacuum of from 4 to 15 inches of mercury, gives rise to a temperature varying from 205° F. to 180° F., the precise temperature peak of the phase being attained and being accurately controlled. In order to prevent injury of the mix by concussive action, it is desirable to intermingle gently the steam and the mix, so that the commingling takes place in the absence of any blow or shock. However, since recovery of the fat content of the mix in the form of butter is not sought, this gentle intermingling, while preferable over concussive intermingling, is not absolutely essential.

By flash pasteurizing is meant bringing the mix to the temperature at which pasteurization takes place in practically instantaneous manner, and holding the mix at that temperature for a short space of time sufficient to permit pasteurization to be carried to the desired extent. Necessarily, in order to produce complete pasteurization in a short time space, temperatures are required considerably in excess of the usual temperatures (say in the neighborhood of 145° F.) at which pasteurization of the mix has hitherto been carried out.

Because of the high temperatures required it was thought, prior to my invention, to be impracticable to employ flash pasteurization successfully in the treatment of ice cream mixes, because such high temperatures, would frequently result in a cooked or scalded taste in the milk, in addition to a "caramel" flavor in the mix due to the effect on the added sugar of the high temperatures to which the mix is exposed, and also, and perhaps principally, because of the knowledge in the art that at temperatures above 180° F. the strength of the gelatine is adversely affected.

Furthermore, until recently it has been regarded as unsound practice to introduce steam directly into the lacteal fluid, because of many reasons, among the most important of which may be enumerated risk of local overheating, oiling-off of the fat, coagulation of the albumin, damage by concussion, and contamination from steam odors. By introducing the steam under vacuum, however, the temperatures to which the ice cream mix is subjected are closely controlled within limits such that local overheating cannot occur. Furthermore, by my process the temperature to which the mix is raised is uniform throughout the entire volume of mix undergoing treatment, so that likelihood of intense local heating is additionally avoided. By gently intermingling the steam and the mix, oiling-off of the fat, coagulation of the albumin, or concussion damage, are all avoided, while the vacuum which maintains is found to draw off all detrimental steam odors. Thus I have found flash pasteurization of an ice cream mix by the use of direct steam contact to be entirely feasible and successful, and resulting in a marked improvement over all prior known methods.

Thus I have made the very important discovery that with flash pasteurization in which the mix is brought almost instantaneously to a temperature even as high as say 205° F., and is maintained at that temperature for a very short period, say from one to five seconds, depending upon the nature and composition of the particular mix, complete pasteurization results, and I find that at the same time there is no resultant injury to the product, either by impairing the strength of the gelatine constituent, by changing the characteristics of the added sugar so as to give rise to a "caramel" flavor, or by imparting a cooked or "overheated" flavor to the mix. Particularly is the pasteurization carried effectively to completion and the disadvantages which would ordinarily be anticipated eliminated to a still greater degree, by "flashing" or flash pasteurizing the mix by the addition of steam under vacuum.

The steam is found to perform the important function of atomising the mix and removing volatile chemical impurities from the mix by distilling them off and entraining them. The fact that the mix is present in a rarified state mingled with steam permits the vacuum to carry off these impurities more readily, inasmuch as there are no surrounding masses of mix or high surface tension to retard and impede the escape of these impurities. This division of the mix into particles and their pasteurisation by direct contact with live steam is of value in that it eliminates the necessity of heated metal surfaces and sweeps in the pasteurizing process, for ensuring uniform heating of the mix, and at the same time greatly accelerates the heating of the mix in its contact with the steam, ensuring even and uniform heating, and boiling and facilitating the liberation of $CO_2$ and other gases and vapors from the mix, and also exposing the fine particles of the mix to the direct cleansing action of the live steam. Of course that portion of the steam, which is condensed, is incorporated in the mix, diluting the same temporarily and aiding in cleansing the mix. The action of the vacuum ensures that as soon as the impurities of whatever nature are released from the mix, they will be drawn off and transferred to the uncondensed portion of the steam and will be permitted no opportunity to return to the mix or be driven into the fat masses. Furthermore, the vacuum, which is simply another way of referring to absence of air, is represented by a reduction of the quantity of air present during the heat treatment, which air would ordinarily be more active than usual because of the elevated temperatures it would have, so that this vacuum tends to guard against oxidization of the fats, and undue action on the vitamin content of the mix. The use of vacuum, by decreasing the surface tension of the mix, increases the rapidity of evaporation during boiling, and accelerates the deodorization and dehydration back to approximately the moisture content of the initial mix.

For the flash pasteurizing step at temperatures of say from 180° F. to 205° F., the vacuum maintaining in the pasteurizer which is to be used is to be confined within the limits of 14 to 4 inches of mercury. Because when steam is expanded from a higher to a lower pressure, its temperature does not follow the theoretical fall unless the excess heat therein is consumed by the evaporation of moisture, it is preferable that the steam supplied to the pasteuriser should contain the required amount of moisture in suspension, failing which it is advisable to inject moisture into the steam. Because the principal available heat content in the steam is from what is known as the "latent heat of vaporization," that is, the heat released by the steam condensing to water from and at the same temperature, it is desirable to utilize this latent heat to its fullest extent. Accordingly, the steam as fed to the pasteurizer, should not contain more free moisture than is needed to absorb the excess heat aforementioned.

Prior to intermingling the steam and the mix, the latter is broken up into a fine stream or streams, or into fine droplets. When the steam contacts the mix in this condition, it physically contacts a maximum area of mix for a given volume of the latter, in a minimum time. In this manner substantially all particles of the mix are directly subjected to the high temperatures, and because there is no restraining pressure action on any part of the mix by the surrounding or overlying portions of the mix, a ready escape is provided for entrapped gases, feed essences, and aromatic and volatile oils, which are then immediately transferred to the uncondensed steam and carried away in the vacuum stream. Furthermore, the direct contact of all particles of the mix with the live steam, without the necessity of transference of heat by conduction, and consequent drop in temperatures, ensures that all particles of the mix are brought to the same uniform peak temperature, because of the fact that the mix is then in a boiling state and pasteurization is rendered much more uniform than is possible in the case of a batch process.

The instantaneous flashing or treating of the mix to the temperature of the steam, i. e., the pasteurizing temperature which prevails, is found to minimize the risk of interference with the character and flavor of the constituents of the mix. This is due in part to the fact that the bacterial organisms are unable to adapt themselves to the sudden rise in temperature, and so are rendered less able to resist the heat, and in part to the fact that the mix is brought so quickly to the boiling point at its peak temperature that there is no opportunity for fusion of bacterial products and vegetable oils contaminating the milk serum, into the molten fat globules, as occurs during the slower heating methods. On the contrary, and for reasons pointed out hereinbefore, these impurities are expelled.

Because thin streams of liquid, or clouds of finely divided particles, of the mix are subjected to steam pasteurizing action for a time interval of say one to five seconds, it follows that the process can best be carried out in a continuous manner as contrasted with the batch processes according to the practice now employed, where each batch must be held in the pasteurizer for say half an hour or more, the pasteurizer then emptied, scoured, and refilled before a second batch can be handled. Thus it will be seen that the capacity of the plant for equipment of the same relative volume is greatly increased, the efficiency of operation of the plant and utilization of equipment improved, and the cost of operation reduced to a minimum.

Following the pasteurizing step, I find it desirable to subject the mix to a more intensive distilling action at a lower temperature. Boiling at a lower temperature may be brought about by transferring the pasteurized mix to a second container, where it is subjected to a higher vacuum say of the order of 15 or more inches of mercury. The second container and its inlet pipe which may be called a deodorizer, is of such capacity that the mix, in its continuous passage through the deodorizer, is retarded therein long enough to permit distillation therein at the vacuum conditions prevailing, and to permit most of any residual aromatic or volatile flavoring oils, food essences, occluded or entrapped gases to pass off together with the steam. Additionally, assuming the preferred practice of pasteurizing with steam to have been adopted, some of the increased water content due to dilution of the mix from condensed steam, is evaporated off.

However, I contemplate that should for any reason additional steam be desired in this step, to facilitate the distilling action of the moisture content of the mix when the latter is freed of its surface tension in the higher vacuum of the deodorizer, such additional steam may be added early in this process, that is, either where the mix enters the pasteurizer or where the mix begins to embark upon this second step.

Finally, an optional step may be employed, as desired, to impart to the mix a sweet, nutty flavor. This step comprises subjecting the mix, preferably in still another chamber, to additional vacuum, say of the order of 20 inches to 29 inches of mercury, thereby cooling the mix to a temperature of from 140° F. to 80° F., and boiling it and further dehydrating it under the prevailing conditions, the steam so produced being extracted.

Although I am not definitely informed as to the precise reason why this last treatment imparts the aforementioned sweet nutty flavor to the mix, and although I am not called upon by the patent laws of this country to specify why such action takes place, I venture, purely as a surmise, the thought that the intensive vacuum cooling and dehydration results in changes in the milk sugar. Further deodorization occurs in this step, and dehydration is completed to the desired extent, say to the water content of the initial mix or even less.

An ice cream mix according to the aforementioned generally-described process is found to have greatly improved flavor, as well as greatly improved texture. It is smoother, has better keeping qualities, and has an improved capacity to "stand up" or defer melting under exposure to atmospheric conditions.

As has been suggested hereinbefore, the improved flavor of the product treated according to my new process may be attributed to three-fold reasons: First, the extraneous aromatic or volatile oils, fatty acids which have been liberated, food essences or occluded and entrapped gases are driven off by the energetic and complete operation of the steam on the thin stream or streams of the mix; second, the treatment of the mix is uniformly distributed through the entire body of the mix; third, the mix is substantially sterile and its keeping qualities are improved.

The improved texture and greater smoothness I attribute to the uniformity with which all particles of the mix are subjected to the pasteurizing action resulting in the rendering of the protein constituents more soluble and their more even distribution throughout the mass, thus dividing or separating the fat mass more evenly. Driving off volatile acids and gases necessarily results in a decrease of the acidity of the mix, and at the same time, the thinning of the mix into streams or droplets ensures that any neutralizing agent is afforded every opportunity to react completely with the mix, owing to the absolute evenness of the heat treatment.

The substantial sterility of the product resulting from my new treatment is highly advantageous in that it gives rise to markedly enhanced keeping qualities, while the last-mentioned phenomenon, superior ability to defer melting under atmospheric conditions, I suggest (without however restricting myself to such explanation) as being due to the caseinageous content of the mix being brought, during the course of the practice of my invention, into a more soluble form, and being more evenly dispersed through the emulsions, this action at the same time serving to separate the masses of fat more evenly and causing the structure of the product to be more coherent and homogenous.

Finally, the mix may be homogenized in the usual way, that is to say, it may be forced for example, under pressure through a small spray head where it is atomized and broken up into small particles, along with the masses of fat, so that the product is of extremely uniform texture and so that there exists no possibility of the fat masses separating into butter. If the mix is to be homogenised thus subsequently to treatment, the peak vacuum carried is that which will reduce the temperature of the mix only to the desired point, say approximately 140° F. The mix after homogenisation is then if desired, further dehydrated, as for example, by additional vacuum treatment and chilled ready for use. As an alternative the raw mix can be homogenised prior to pasteurisation in which case the highest possible vacuum is applied to the mix before delivery.

As a typical example of my new process, the following is cited:

The lacteal ingredients are mixed and heated to a suitable temperature of say 140° F., and the sugar and gelatine or other suitable binder, in suitable form, may be added at this stage and thoroughly blended in, although this admixture may be delayed until a slightly higher temperature is reached, if desired. The mix is then pasteurized by the application of steam under vacuum by instantly raising the temperature of the mix to say 180° F., to 205° F., and retarding it there at a boiling state for from one to say five seconds, depending upon the nature and composition of the particular mix, until complete pasteurization takes place. A suitable pasteurizer for this purpose will be described hereinafter.

After such pasteurization under vacuum the pasteurized mix is drawn into a deodorizer wherein additional steam is added if desired and subjected to say 15 to 18 inches of vacuum sufficient to bring the temperature down to a boiling temperature of 180° F. to 170° F. The treated mix then passes into a vacuum of about 24 inches and is cooled thereby to 140° F. this being a suitable temperature at which to effect homogenization. The mix is then homogenized in the usual way and will then be preferably subjected to further cooling and dehydration in a high vacuum container such as that disclosed in the drawing.

Although as suggested hereinbefore, any suitable equipment may be employed for carrying out my new process, the structures illustrated in the drawing are especially advantageous to that end.

Referring now to the drawing in which a front elevation of a complete apparatus combining the pasteuriser, deodoriser and cooler is shown and wherein the pasteuriser and portion of the connecting pipe passing from said pasteuriser to the deodoriser are in section.

The apparatus comprises three vertical vessels or containers namely the pasteuriser 1, the deodoriser 2 and the cooler unit 3 which are so mounted to a base as to be disposed around a compound ejector condenser 4, such condenser 4 being capable of creating two different degrees of vacuum, one of which is applied via vapour pipe 5 to the top of the cooler 3 and the other via vapour pipe 6 to the deodoriser 2.

The pasteuriser 1 has the inlet tank 7 at its top portion, a float valve 8 within said tank and a liquid inlet pipe 9 extending from the float valve 8 to within the pasteuriser 1, this inlet pipe 9 having a spray ring 10 at its lower end so that the liquid is broken up into fine drops which fall to the bottom of the pasteuriser vessel 1, a steam inlet 11 being also provided near the top of the pasteuriser 1 and provided with control valve means (not shown).

At the bottom of the pasteuriser 1 there is a connecting pipe 12 passing between the pasteurizer 1 and the deodoriser 2, said connecting pipe 12 having a steam cleansing pipe 13 fitted thereto to the deodoriser side of automatically controlled equilibrium valve mechanism 14, the steam cleansing pipe 13 passing down the center of the vertical portion of the connecting pipe 12 and having its end closed by a conical plug 15, there being a series of holes 16 in the side of the pipe 13 just above the plug 15.

The function of the automatically controlled valve mechanism 14 is to control the degree of vacuum applied in the pasteuriser 1 and as obtained from the greater degree of vacuum applied within the deodoriser 2, the vacuum of the pasteuriser 1 being obtained via the connecting pipe 12.

The automatically controlled valve mechanism 14 comprises a bomb type valve 17 disposed on a seating 18 within the connecting pipe 12 so as to be subject at its seating 18 to the action of the vacuum applied within the deodoriser 2, this valve 17 having a loop 19 at its bottom through which the inner end of a lever 20 engages, this lever having a ball pivot engaged within a socket disposed in the connecting pipe wall, the outer end of the lever 20 being threaded to take an adjustment nut 21 in a groove of which a ring is engaged from which a flexible Bowden wire or like 22 passes upward to a piston disposed within a cylinder 23 which is connected to the condenser 4 in such a position that the portion of the cylinder 23 above the piston would be subjected to the vacuum within the chamber of said condenser 4, which applies vacuum to the deodoriser 2.

The connecting pipe 12 passes upward and is then bent to pass tangentially and in fish tail shape 24 into the deodoriser 2 in such manner as to direct the liquid towards the deodoriser inner wall so that said liquid would travel in film form spirally down within the said deodoriser 2.

At the bottom of the deodoriser 2, a float operated outlet valve (not shown) is provided to control flow of liquid therefrom into the connecting pipe 25 passing between the deodoriser 2 and the cooler 3, this connecting pipe 25 passing upward and being then bent to pass tangentially and in fish tail shape into the cooler 3 in such manner as to direct the liquid towards the cooler inner wall so that the said liquid would travel in film form spirally down within said cooler 3, said connecting pipe 25 also having a steam cleansing pipe fitted thereinto (if desired) of type similar to that within the connecting pipe 12.

The vapor pipes 5 and 6 would project downward into the deodoriser 2 and into the cooler 3 so as to minimize possibility of liquid particles being drawn to the ejector condenser 4, the lower zones of the deodoriser 2 and the cooler 3 having surrounding water jackets 26 and 27 connected to each other by pipe 28, and having inlet 29 and outlet 30.

The connecting pipes 12 and 25 between the pasteuriser 1 and the deodoriser 2 and between the latter and the cooler 3 would have draining cocks 31, the bottom of the cooler 3 having a main outlet pipe 32 which would pass to the usual pump means which would withdraw the treated liquid from the plant.

The liquid to be treated would be admitted to the float tank 7 via inlet pipe 33, vacuum gauges 34 and 35 being fitted to the vapour pipes 5 and 6 to indicate the degrees of vacuum in the cooler 3 and deodoriser 2, a pressure gauge 36 being also fitted to the pressure water inlet pipe 37 of the condenser 4, various thermometers 38 being also applied at desired points and a snifter valve 39 to the condenser 4 at its portion which is connected to deodoriser 2.

In operation, in the first case it would be necessary to sterilize the whole apparatus and to do this, steam is admitted via inlet 11 on the pasteuriser 1 and cleansing pipes 13 on connecting pipes 12 and 25, the steam being allowed to flow through the apparatus.

Having effected sterilization, the ejector condenser 4 is started up which creates a vacuum via the respective vapour pipes 5 and 6 to the cooler 3 and the deodoriser 4, the former having say 24 inches of vacuum applied thereto and the latter say 15 to 18 inches due to their connection to separate portions of the condenser 4, the deodoriser vacuum being governed by the snifter valve 39.

For pasteurising the mix, the equivalent vacuum for correct pasteurising temperature is say 6 inches and in order to obtain this degree and substantially maintain same it is then necessary to adjust the automatic equilibrium control valve mechanism 14.

The vacuum of the deodoriser 2 as transmitted through the connecting pipe 12 tends to lift the equilibrium valve 17 from its seating 18, but the vacuum within the portion of the condenser 4 connected to the deodoriser as transmitted to the piston in cylinder 23 applies resistance to lifting of the valve 17 via Bowden wire 22 and the lever 20 which is connected to the bottom of the valve 17.

The moving of the adjustment nut 21 on lever 20 therefore enables a ratio to be obtained between the area of the piston within cylinder 23 and the area of the valve seat 18 so that the adjustment obtained will cause the vacuum in the pasteuriser 1 to be held stable at any desired degree in relation to the degree of vacuum in the deodoriser 2, the valve 17 remaining open until the desired degree of vacuum has been obtained in the pasteuriser 1, whereupon the valve 17 would move to a position which would just provide sufficient area for the passage of the vapourous mix while maintaining such degree of vacuum constant.

Steam being admitted to the pasteurizer 1 via steam inlet 11 and mix admitted to the inlet tank 7 of said pasteurizer 1 via inlet pipe 33, said mix while it is raining down from spray ring 10, would come into direct contact with the steam within the pasteurizer and by such contact acquire pasteurising temperature by condensing the steam, the mix reaching the bottom of the pasteuriser in a boiling state at the desired temperature and being drawn past the equilibrium valve 17 to the deodoriser 2 due to the fact that there is say 15 to 18 inches of vacuum in the deodoriser 2 as compared with say 6 inches in the pasteuriser 1.

On passing the valve 17, additional steam for processing the mix may be admitted thereto by the steam cleanser 13, the steam and cream passing up the connecting pipe 12 at high velocity and through fish tail 24 into the deodoriser 2 wherein the mix spirals down the internal wall while subjected to the 15 to 18 inches of vacuum, the cyclonic spiralling action causing separation of the vapours from the mix in the manner as has been described.

The mix accumulating at the bottom of the deodoriser 2 causes a liquid seal between the deodoriser 2 and the cooler 3 at all times, the float valve (not shown) controlling the flow of liquid from the deodoriser 2 to the cooler 3, such flow being caused because of the greater vacuum within the cooler 3.

The mix while passing through the connecting pipe 25 between the deodoriser 2 and the cooler 3 may be subjected to steam cleansing by the steam cleanser in said connecting pipe the mix entering the cooler 3 by its fish tail and spiralling down the internal wall while subjected to the 24 inches of vacuum, the vapours being expelled by cyclonic force as in deodoriser 2.

The spiralling action of the mix down the internal walls of the cooler 3 is similar to that effected in the deodoriser 2 but as there is a greater degree of vacuum within the cooler 3, the extracting effect on the vapours is greater, the mix dropping in temperature to that equivalent to the negative pressure of the cooler.

The mix on reaching the bottom of the cooler 3 is removed therefrom via main outlet pipe 32 by pumping in the usual way, the cooling water jackets 26 and 27 of the deodoriser 2 and cooler 3 consolidating the liquid after deodorising and after cooling.

My invention may be seen to comprise a process of treating an ice cream mix of the usual composition, which imparts to such mix a substantially sterile character, of superior flavor, texture and holding qualities; in short, properties far superior to those hitherto obtainable, all with a minimum investment in equipment and expenditure of time and labor.

As many possible embodiments may be made of my invention, and as many changes may be made in the embodiments hereinbefore set forth, it will be understood that all matter described herein is to be interpreted as illustrative, and not in a limiting sense.

I claim:

1. The method of continuously processing ice cream mix containing milk solids and free sugar, comprising the steps of substantially instantaneously heating said ice cream mix to a pasteurizing temperature by mixing with steam while under the effect of subatmospheric pressure, deodorizing and distilling the said pasteurized mix by subjecting the same in counter flow to subatmospheric pressure substantially less than said pasteurizing pressure, and further distilling and cooling said deodorized mix to further remove condensed steam and volatile impurities and to protect the mix against the harmful effect of light at high temperatures by subjecting the same in counter flow to subatmospheric pressure substantially less than the deodorozing pressure, whereby caramelization of sugar in the mix is prevented and the viscosity and acidity of the mix is reduced.

2. The method of continuously processing ice cream mix containing milk solids and free sugar, comprising the steps of substantially instantaneously heating said ice cream mix to a pasteurizing temperature ranging from about 205° to about 180° F. by mixing with steam while under the effect of vacuum of from about 4 to about 15 inches of mercury, deodorizing, and distilling the said pasteurized mix by subjecting the same in counter flow to subatmospheric pressure substantially less than said pasteurizing pressure, and further distilling and cooling said deodorized mix further to remove condensed steam and volatile impurities and to protect the mix against the harmful effect of light at high temperatures by subjecting the same in counter flow to subatmospheric pressure substantially less than the deodorizing pressure, whereby caramelization of sugar in the mix is prevented and the viscosity and acidity of the mix is reduced.

3. The method of continuously processing ice cream mix containing milk solids and free sugar, comprising the steps of substantially instantaneously heating said ice cream mix to a pasteurizing temperature by mixing with steam while under the effect of subatmospheric pressure, deodorizing and distilling the said pasteurized mix by subjecting the same in counter flow to vacuum ranging up from about 15 inches of mercury, thereby subjecting the mix in this second stage to a corresponding temperature ranging downward from about 180° F., and further distilling and cooling said deodorized mix to further remove condensed steam and volatile impurities and to protect the mix against the harmful effect of light at high temperatures by subjecting the same in counter flow to subatmospheric pressure substantially less than the deodorizing pressure, whereby caramelization of sugar in the mix is prevented and the viscosity and acidity of the mix is reduced.

4. The method of continuously processing ice cream mix containing milk solids and free sugar, comprising the steps of substantially instantaneously heating said ice cream mix to a pasteurizing temperature by mixing with steam while under the effect of subatmospheric pressure, deodorizing and distilling the said pasteurized mix by subjecting the same in counter flow to subatmospheric pressure substantially less than the pasteurizing pressure, and further distilling and cooling said deodorized mix to further remove condensed steam and volatile impurities and to protect the mix against the harmful effect of light at high temperatures by subjecting the mix in counter flow to vacuum ranging up to about 29 inches of mercury, to reduce the temperature to a range of from about 140° to about 80° F., whereby caramelization of sugar in the mix is prevented and the viscosity and acidity of the mix is reduced.

5. The method of continuously processing ice cream mix containing milk solids and free sugar, comprising the steps of substantially instantaneously heating said ice cream mix to a pasteurizing temperature ranging from about 205° to about 180° F. by mixing with steam while under the effect of vacuum of from about 4 to 15 inches of mercury, deodorizing and distilling the said pasteurized mix by subjecting the same in counter flow to vacuum ranging up from about 15 inches of mercury, thereby subjecting the mix in this second stage to a corresponding temperature ranging downward from about 180° F., and further distilling and cooling said deodorized mix to further remove condensed steam and volatile impurities and to protect the mix against the harmful effect of light at high temperatures by subjecting the mix in counter flow to vacuum ranging up to about 29 inches of mercury, to reduce the temperature to a range of from about 140° to about 80° F., whereby caramelization of sugar in the mix is prevented and the viscosity and acidity of the mix is reduced.

6. The method of continuously processing ice cream mix containing milk solids, free sugar and stabilizing materials, comprising the steps of substantially instantaneously heating said ice cream mix to a pasteurizing temperature by mixing with steam while under the effect of subatmospheric pressure, deodorizing and distilling the said pasteurized mix by subjecting the same in counter flow to subatmospheric pressure substantially less than said pasteurizing pressure, and further distilling and cooling the said deodorized mix to further remove condensed steam and volatile impurities and to protect the mix against the harmful effect of light at high temperatures by subjecting the same in counter flow to subatmospheric pressure substantially less than the deodorizing pressure, whereby de-stabilization of the protein in the milk solids and in the stabilizing material is prevented, the natural fresh flavor of the mix thus being maintained and the resultant ice cream produced possessing desirable texture and body.

7. The method of continuously processing ice cream mix containing milk solids, free sugar and stabilizing materials comprising the steps of substantially instantaneously heating said ice cream mix to a pasteurizing temperature ranging from about 205° to about 180° F. by mixing with steam while under the effect of vacuum of from about 4 to about 15 inches of mercury, deodorizing and distilling the said pasteurized mix by subjecting the same in counter flow to subatmospheric pressure substantially less than said pasteurizing pressure, and further distilling and cooling said deodorized mix to further remove condensed steam and volatile impurities and to protect the mix against the harmful effect of light at high temperatures by subjecting the same in counter flow to subatmospheric pressure substantially less than the deodorizing pressure, whereby de-stabilization of the protein in the milk solids and in the stabilizing material is prevented, the natural fresh flavor of the mix thus being maintained and the resultant ice cream produced possessing desirable texture and body.

8. The method of continuously processing ice cream mix containing milk solids, free sugar and stabilizing materials comprising the steps of substantially instantaneously heating said ice cream mix to a pasteurizing temperature by mixing with steam while under the effect of subatmospheric pressure, deodorizing and distilling the same pasteurized mix by subjecting the same in counter flow to vacuum ranging up from about 15 inches of mercury, thereby subjecting the mix in this second stage to a corresponding temperature ranging downward from about 180° F., and further distilling and cooling said deodorized mix to further remove condensed steam and volatile impurities and to protect the mix against the harmful effect of light at high temperatures by subjecting the same in counter flow to subatmospheric pressure substantially less than the deodorizing pressure, whereby de-stabilization of the protein in the mix solids and in the stabilizing material is prevented, the natural fresh flavor of the mix thus being maintained and the resultant ice cream produced possessing desirable texture and body.

9. The method of continuously processing ice cream mix containing milk solids, free sugar and stabilizing materials comprising the steps of substantially instantaneously heating said ice cream mix to a pasteurizing temperature by mixing with steam while under the effect of subatmospheric pressure, deodorizing and distilling the said pasteurized mix by subjecting the same in counter flow to subatmospheric pressure substantially less than said pasteurizing pressure, and further distilling and cooling said deodorized mix to further remove condensed steam and volatile impurities and to protect the mix against the harmful effect of light at high temperatures by subjecting the mix in counter flow to vacuum ranging up to about 29 inches of mercury, to reduce the temperature to a range of from about 140° to about 80° F., whereby de-stabilization of the protein in the milk solids and in the stabilizing material is prevented, the natural fresh flavor of the mix thus being maintained and the resultant ice cream produced possessing desirable texture and body.

HENRY LAMONT MURRAY.